April 22, 1969    J. H. HIGGINS    3,439,872
CLASSIFYING APPARATUS
Filed March 7, 1966
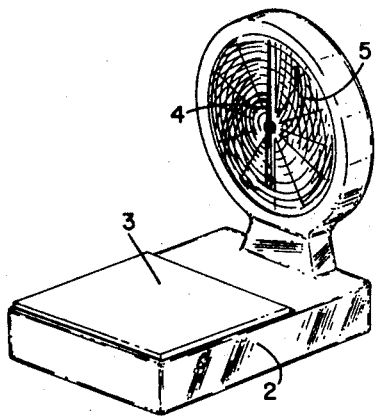
FIG. I.
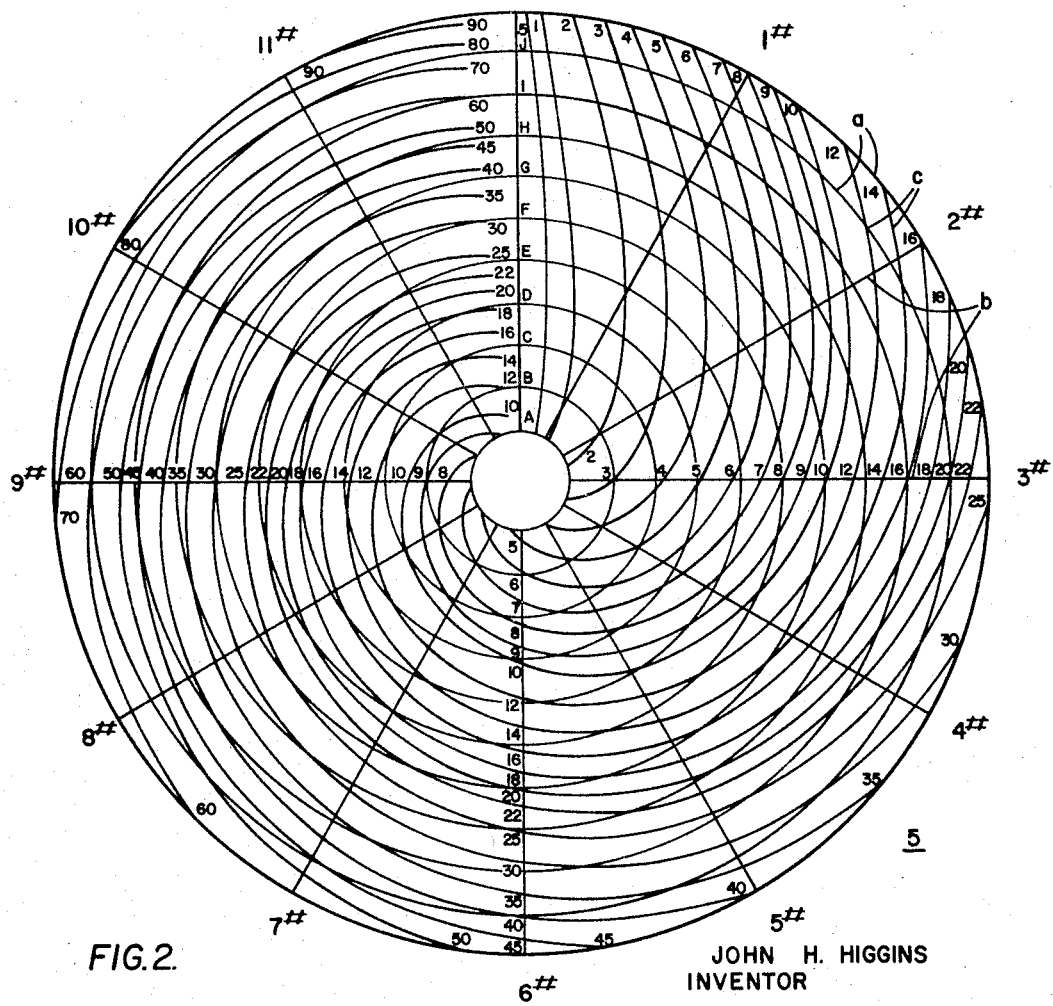
FIG. 2.
JOHN H. HIGGINS
INVENTOR
BY
Hoopes, Leonard & Buell
HIS ATTORNEYS

3,439,872
CLASSIFYING APPARATUS
John H. Higgins, % Mellon National Bank and Trust Company, Mellon Square, Pittsburgh, Pa. 15230
Filed Mar. 7, 1966, Ser. No. 532,428
Int. Cl. G01g 23/22
U.S. Cl. 235—61                                    5 Claims This invention relates to classifying apparatus and particularly to apparatus for classifying an object as to the magnitude of a characteristic thereof per unit of its weight.

While the invention has numerous applications I have put it to practical use in classifying packets or bundles of bank checks as to the value thereof per unit of weight of the bundle. Such classification has important advantages to banks, particularly large commercial banks which process or "clear" checks in large numbers. For purposes of explanation and illustration I shall describe the invention as embodied in apparatus for classifying bundles of bank checks as to the value thereof per unit of weight of the bundle.

A large commercial bank receives checks in bundles from other banks to be processed. An operator processes the checks in bundle after bundle, opening each bundle in turn and processing the individual checks therein before taking up the next bundle. The bundles vary considerably in number of checks and also in value, i.e., the total of the face amounts in dollars of the checks in the bundle. The weight of a bundle is roughly proportionate to the number of checks in the bundle and the time required to process a bundle is also roughly proportionate to the number of checks in the bundle. Thus the time required to process a bundle of checks may be roughly measured by the weight of the bundle. But the value of a bundle of checks has no fixed relation to its weight. A relatively heavy bundle may have relatively little value because the average amount of the checks in the bundle is relatively low while a bundle of relatively light weight may have relatively great value because the average amount of the checks in the bundle is relatively high.

It is important to a large commercial bank to process first bundles of checks having the highest value per unit of weight, particularly near the various deadlines of the banking day as a day's interest may be saved by processing a check before its deadline or one business day instead of on the following day.

Each bundle of checks has the total value of the checks in the bundle marked on it. Heretofore operators have tried by noting the values of bundles and "hefting" the bundles to select for priority in processing the bundles having the highest value per unit of weight, but the success of the effort has depended on the accuracy of the operator's guess as to the value per unit of weight of the bundles.

My classifying apparatus eliminates uncertainty and makes it possible to accurately select an object having the highest magnitude of a characteristic thereof per unit of its weight, specifically when applied to bank checks to accurately select a bundle of checks having the highest value per unit of weight of the bundle.

I provide classifying apparatus comprising a receptacle, means mounting the receptacle for downward retractive movement due to the weight of an object the mangitude of a characteristic of which is known placed on the receptacle, an index member connected with the receptacle movable a distance proportionate to the weight of the object placed on the receptacle and a dial associated with the index member having markings representing magnitudes of said characteristic and other markings intersecting the first mentioned markings representing such magnitudes per unit of weight so that the second mentioned marking read where the index member intersects the first mentioned marking classifies the object placed on the receptacle as to the magnitude of said characteristic thereof per unit of its weight. The spacing between the first mentioned markings may decrease for increasing magnitudes whereby the reading accuracy is greater for relatively low magnitudes than for relatively high magnitudes.

The dial of my classifying apparatus may be circular, the index member may be a pointer pivoted at the center of the dial, the first mentioned markings may be curves on the dial and the second mentioned markings may be concentric circles intersecting the first mentioned markings. The second mentioned markings may be equally radially spaced concentric circles intersecting the first mentioned markings and the spacing between the curves may decrease for increasing magnitudes whereby the reading accuracy is greater for relatively low magnitudes than for relatively high magnitudes.

I further provide classifying apparatus comprising a receptacle, means mounting the receptacle for downward retractive movement due to the weight of a bundle of checks the total value of which is known placed on the receptacle, an index member connected with the receptacle movable a distance proportionate to the weight of the bundle of checks on the receptacle and a dial associated with the index member having markings representing total values of bundles of checks and other markings intersecting the first mentioned markings representing values per unit of weight so that the second mentioned marking read where the index member intersects the first mentioned marking classifies the bundle of checks placed on the receptacle as to the value thereof per unit of its weight.

Other details, objects and advantages of the invention will become apparent as the following description of a present preferred embodiment thereof proceeds.

In the accompanying drawings I have shown a present preferred embodiment of the invention in which—

FIGURE 1 is an isometric view of classifying apparatus in accordance with my invention; and FIGURE 2 is a face view to enlarge scale of the dial of the classifying apparatus shown in FIGURE 1.

Referring now more particularly to the drawings and first to FIGURE 1, there is shown classifying apparatus which in this instance takes the form of a weighing scale with a special circular dial and a pointer pivoted at the center of the dial. The apparatus has a base 2 and a receptacle 3 shown as in the form of a scale platen mounted as well known to those skilled in the art for downward retractive movement relatively to the base 2 due to the weight of an object placed on the receptacle the magnitude of a characteristic of which is known. For example, the object may be a bundle of checks the total value of which is known. The apparatus also has an index member 4 in the form of a pointer pivoted at the center of a special circular dial 5, the pointer being connected with the receptacle or scale platen 3 as well known to those skilled in the art to move angularly over the dial a distance proportionate to the weight of the object placed on the receptacle.

The special dial 5 has markings representing magnitudes of the characteristic above mentioned and other markings intersecting those markings representing such magnitudes per unit of weight so that the second mentioned marking read where the pointer intersects the first mentioned marking classifies the object as to the magnitude of said characteristic per unit of weight.

The dial is shown to enlarged scale in FIGURE 2. In making that dial a series of equally radially spaced concentric circles *a* are drawn and through the center the radial lines *b* 30° apart are drawn. Then the curves *c* are drawn each starting at the center and curving outwardly to the outermost circle *a*. The space inside the innermost circle *a* is left blank because it is not used in use of the classifying aparatus. Portions of the curves *c* are omitted to avoid undue complexity of the dial; the omitted portions are portions which would not be used in use of the classifying apparatus.

The radial lines *b* represent pounds of weight on the receptacle or scale platen as indicated in FIGURE 2. They are not essential to the use of the classifying apparatus since in use the pointer 4 is used to indicate the place where a reading on one of the curves *c* is to be taken. The operator is not concerned with the numerical value of the weight of the object on the receptacle but only with the relationship of the weight of the object to the characteristic involved. For example, when bundles of checks having known total values per bundle are to be classified the operator does not care how many pounds a bundle weighs but is concerned only with its value per pound, which is determined by reading the curve *c* representing the total value of the bundle where the pointer crosses that curve. Indeed it is not the numerical value of the vlaue of the bundle per pound which is important but the relationship of values per pound of the bundles so that those having the greatest value per pound may be processed first. That relationship is represented by the circular zones marked A through J in FIGURE 2. The greater the value per pound of the bundle the farther along in the alphabet will be the letter designating the circular zone containing the point where the pointer crosses the curve *c* representing the total value of the bundle. Bins may be provided into which the bundles may be placed, the bins being lettered to correspond to the lettering of the zones. Each bundle is placed in its proper bin as determined by the classifying apparatus. The bundles in the bins whose letters are farthest along in the alphabet are processed first. Thus if there are any bundles in bin J those bundles are processed; if there are no bundles in bin J those in bin I are processed, etc.

Each curve *c* represents the magnitude of a known characteristic of the object being classified; for example, the total value of a bundle of checks. In FIGURE 2 the curve marked .5 may represent $500, the curve marked 1 may represent $1,000, the curve marked 2 may represent $2,000, etc.

Each curve *c* in FIGURE 2 is laid out by plotting points for each of various magnitudes of a known characteristic for a series of corresponding weights. For example, the known characteristics may be the total value of a bundle of checks. The curves *c* are designated respectively .5, 1, 2, 3, 4, 5, 6, 7, 8, 9, 10, 12, 14, 16, 18, 20, 22, 25, 30, 35, 40, 45, 50, 60, 70, 80 and 90. To convert these to dollar values each may be multiplied by $1,000, or for bundles of checks of greater value, by $10,000 or even by $100,000. Any other multiplier may be used appropriate to the circumstances. Assuming a multiplier of $1,000 for purpose of illustration and taking for example curve *c* numbered 6, that curve would be used for classifying a bundle of checks having an aggregate value of $6,000. The value per pound of a bundle of checks having an aggregate value of $6,000 would be as follows for various weights:

| Weight (pounds): | Dollar value per pound |
|---|---|
| 1 | 6,000 |
| 2 | 3,000 |
| 3 | 2,000 |
| 4 | 1,500 |
| 5 | 1,200 |
| 6 | 1,000 |
| etc. | |

Radial distances from the center represent values. A point may be plotted on the 1# radial line at a distance representing $6,000 from the center, a point may be plotted on the 2# radial line at a distance representing $3,000 from the center, etc., and the points are connected by a curve. All of the curves *c* are similarly laid out. Actually the curves of FIGURE 2 are laid out using the logarithms of the values, making a more compact and more readily usable dial than is made by using the values themselves, although the values themselves may be used if desired and their use may be indicated in certain circumstances.

While I have shown and described a present preferred embodiment of the invention it is to be distinctly understood that the invention is not limited thereto but may be otherwise variously embodied within the scope of the following claims.

I claim:

1. Classifying apparatus comprising a receptacle, means mounting the receptacle for downward retractive movement due to the weight of an object the magnitude of a characteristic of which is known placed on the receptacle, an index member connected with the receptacle movable a distance proportionate to the weight of the object placed on the receptacle and a dial associated with the index member having markings representing magnitudes of said characteristic and other markings intersecting the first mentioned markings representing such magnitudes per unit of weight so that the second mentioned marking read where the index member intersects the first mentioned marking classifies the object placed on the receptacle as to the magnitude of said characteristic thereof per unit of its weight.

2. Classifying apparatus as claimed in claim 1 in which the spacing between the first mentioned markings decreases for increasing magnitudes whereby the reading accuracy is greater for relatively low magnitudes than for relatively high magnitudes.

3. Classifying apparatus as claimed in claim 1 in which the dial is circular, the index member is a pointer pivoted at the center of the dial, the first mentioned markings are curves on the dial and the second mentioned markings are concentric circles intersecting the first mentioned markings.

4. Classifying apparatus as claimed in claim 1 in which the dial is circular, the index member is a pointer pivoted at the center of the dial, the first mentioned markings are curves on the dial and the second mentioned markings are equally radially spaced concentric circles intersecting the first mentioned markings, the spacing between the curves decreasing for increasing magnitudes whereby the reading accuracy is greater for relatively low magnitudes than for relatively high magnitudes.

5. Classifying apparatus comprising a receptacle, means mounting the receptacle for downward retractive movement due to the weight of a bundle of checks the total value of which is known placed on the receptacle, an index member connected with the receptacle movable a distance proportionate to the weight of the bundle of checks on the receptacle and a dial associated with the index member having markings representing total values of bundles of checks and other markings intersecting the first mentioned markings representing values per unit of weight so that the second mentioned marking read where the index member intersects the first mentioned marking classifies the bundle of checks placed on the receptacle as to the value thereof per unit of its weight.

References Cited

UNITED STATES PATENTS

| | | | |
|---|---|---|---|
| 685,878 | 10/1901 | Spaulding | 177—31 |
| 1,251,148 | 12/1917 | Wetzel | 177—31 |
| 1,444,381 | 2/1923 | Landenberger | 235—84 |
| 2,118,773 | 5/1938 | Ball | 235—83 |
| 2,727,391 | 12/1955 | Kolisch | 73—432 |

STEPHEN J. TOMSKY, *Primary Examiner.*

U.S. Cl. X.R.

235—83; 177—25; 73—432